April 23, 1957 J. A. HARINGX 2,789,816
DEVICE FOR DRIVING PERFORATED PICTURE FILM TAPE BY
MEANS OF A TOOTHED CONSTANT-SPEED DRIVE ROLLER
Filed Feb. 16, 1954 2 Sheets-Sheet 1

INVENTOR
JOHANNES ADRIANUS HARINGX

BY *[signature]*

AGENT

April 23, 1957   J. A. HARINGX   2,789,816
DEVICE FOR DRIVING PERFORATED PICTURE FILM TAPE BY
MEANS OF A TOOTHED CONSTANT-SPEED DRIVE ROLLER
Filed Feb. 16, 1954   2 Sheets-Sheet 2

INVENTOR
JOHANNES ADRIANUS HARINGX

BY

AGENT

United States Patent Office 2,789,816
Patented Apr. 23, 1957

2,789,816

DEVICE FOR DRIVING PERFORATED PICTURE FILM TAPE BY MEANS OF A TOOTHED CONSTANT-SPEED DRIVE ROLLER

Johannes Adrianus Haringx, Eindhoven, Netherlands, assignor, by mesne assignments, to North American Philips Company, Inc., New York, N. Y., a corporation of Delaware Application February 16, 1954, Serial No. 410,659

Claims priority, application Netherlands February 21, 1953

5 Claims. (Cl. 271—2.3)

The invention relates to a device for driving perforated picture film tape by means of a toothed constant-speed drive roller the circular pitch of which is made slightly greater than the length of a picture frame on the non-shrunk film tape and in which the picture frames are successively illuminated or scanned by a light ray, the contact between the driving tooth (teeth) and the film tape being broken in the period of time between the illumination or scanning of a picture frame and the illumination or scanning of the next subsequent picture frame. The term "the length of a picture frame" is to be understood to mean the joint dimension in the direction of the film tape of a picture on the film and of the boundary strip lying between this picture and the next picture. Such devices can be used for reproducing or taking film pictures. It is possible to use such a device in case a picture film is required to be scanned and to be transmitted by means of a television transmitter without direct reproduction. Obviously this device can also be used for projecting a picture film onto a projection screen. The picture required to be taken may be an image on a television screen or a natural image.

The dimensions of the circular pitch have been arranged in the above-mentioned sense in order to ensure that during the scanning or illumination of a single picture frame its speed is constant and consequently equal to the peripheral speed of the drive roller. Due to the choice of the circular pitch during the scanning or illumination of a picture frame the film tape on either side of the picture frame engages one tooth of the drive roller with only one perforation boundary so that during the scanning or illuminating of one picture frame the speed of the film tape is identical with the constant peripheral speed of the toothed drive roller. If the drive roller comprises teeth only at one side only one tooth engages a perforation boundary during the scanning or illuminating process. The invention relates also to devices comprising such a drive roller. Obviously in any case it is necessary for the remaining teeth of the drive roller to mesh with the film tape perforations with a certain amount of clearance, since in the opposite case the perforations would be damaged. The object of the above-mentioned measures is to avoid difference in the speed of the film tape owing to changes in the length of the film tape in different conditions due to ageing of the tape material and/or the influence of the relative ambient humidity. Due to the measures to avoid these speed differences the film tape is subjected to displacements which would not correspond with the length of the picture frames, if the film should have shrunk. The corrections which are required consequently can be made in the above described device during the period of time between the illumination or scanning of two successive picture frames.

In a known device of this kind the film tape is passed between two smooth rollers when it has come off the drive roller. These rollers are positioned in a manner such that the contact of the perforation boundary and the flank(s) of the transporting tooth (teeth) is broken precisely in the period of time between the illumination of two successive picture frames.

Since the period of time available for this correction is very short, in the known device the tooth flanks of the teeth provided on the drive roller are required to conform truly with the path described by the boundary of the film perforations whilst the film tape moves off the drive roller. In use this true form of the tooth flank may be lost in course of time owing to wear with the result that the displacement correction is already partly effected during the movement of a perforation boundary over the tooth flank. The period of time in which this correction is now effected has become inadmissibly long. In addition, the rounding of the perforation boundary will be different in different film tapes. The transition of the tooth flank to the upper boundary of the tooth is also very susceptible to wear. The above-mentioned circumstances render it difficult to predetermine at which moment the contact between the transporting tooth (teeth) and the boundary (boundaries) of the film perforations is broken.

According to the invention this contact is broken in that the film tape is struck off the drive roller by a striking-off mechanism at the point of the transporting tooth (teeth) at high speed. Owing to the high speed at which the contact is broken the correction of the position of the picture frame relatively to the device is effected in a very short period of time. This period of time consequently lies in between the available limits with the result that defects in the shape of the tooth flank and/or of the boundaries of the film tape perforations no longer have a detrimental effect.

In a suitably chosen embodiment of a device according to the invention the striking-off mechanism consists of a fixed spring which is periodically released by an eccentric from a given initial position with the result that the spring at the point of the transporting tooth (teeth) strikes the film tape off the drive roller.

Preferably the spring is fixed unilaterally, the free end striking the film tape off the drive roller. This can result in a large deflection of the free end of the spring which is utilised for striking the film tape off the drive roller. In this event the large deflection ensures a high speed of the spring end.

In order to obtain a satisfactory effect it is obviously necessary for the relationship of the number of revolutions of the drive roller and that of the eccentric to be determined by the number of teeth provided on the drive roller. This relationship necessitates the provision of a transmission in the eccentric drive. In order to avoid this transmission the eccentric may consist of a roller arranged so as to be co-axial with the drive roller, directly coupled thereto, and comprising the same number of cams as there are teeth on the drive roller. Since the movement of the portion of the spring which strikes the film tape off the drive roller is required to be substantially radially directed relatively to this roller, a comparatively long spring is required in an eccentric arranged so as to be co-axial with the drive roller to ensure a satisfactory effect between the eccentric and the spring. As a result the spring is likely to be resilient in the direction at right angles to the direction of movement or is required to be heavy to ensure sufficient rigidity. In a preferred embodiment of a device according to the invention the spring is bent so as to be U-shaped and the free ends of the legs of the U are fixed, the legs of the U being bent in a manner such that the part of the spring adjacent the junction point of the legs strikes the film tape off the drive roller.

When the device is operated the spring may be brought into a condition of constant vibration. Consequently the initial position is not determined. In this case the spring may be provided with damping means which may, for example consist of strips made of damping material secured rigidly on both sides of the spring.

The invention will now be described with reference to the accompanying drawing, in which:

Fig. 4 is a plan view of the spring shown in Fig. 2.

Figure 1:
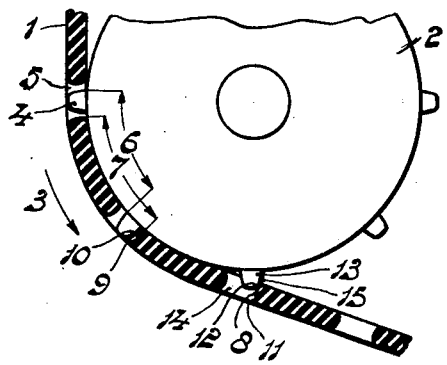
Fig. 1 is an elevation on an enlarged scale of the position of a film tape on the drive roller in the device according to the invention.

Referring now to Fig. 1, a film tape 1 is driven by a toothed drive roller 2 in the direction of an arrow 3. For this purpose the drive roller comprises teeth 4 and the film tape 1 perforations 5. Only one perforation to each picture frame of the film tape is shown in the figure. Between the perforations 5 shown additional perforations may be provided which, however, in this case do not cooperate with the teeth 4 of the drive roller 2. The circular pitch 6 slightly exceeds the length of a picture frame which length corresponds to the distance 7 shown in the figure between two perforations 5 of the non-shrunk film tape 1. It will be understood that a tooth 13 only ensures the transport of the film tape 1 as long as this tooth remains in contact with a boundary 8 of a perforation 14. At the moment at which the contact between the tooth 13 and the perforation boundary 8 is broken the film tape lags relatively to the movement of the drive roller until a perforation boundary 9 engages a tooth flank 10. If a tooth flank 15 of the tooth 13 does not truly conform with the path described by the perforation boundary 8, the film tape 1 will begin to be displaced relatively to the drive roller 2 already before the contact between the perforation boundary 8 and the flank 15 of the tooth 13 is broken. It will also be appreciated that the shape of roundings 11 of the perforation boundary and a transition 12 of the tooth flank 15 to the upper boundary of the tooth 13 can exert a strong influence on the moment at which the contact between the perforation boundary 8 and the flank 15 of the tooth 13 is broken.

Figure 2:
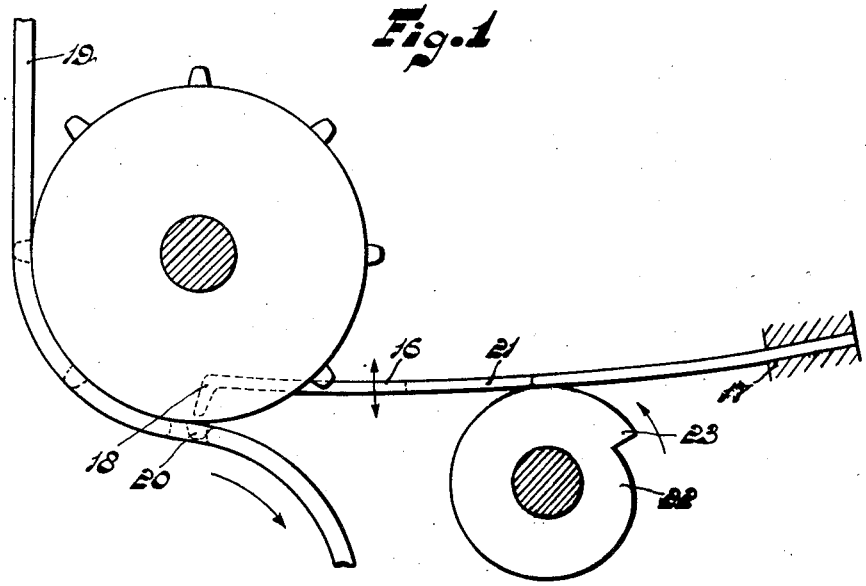
Fig. 2 shows a striking-off mechanism shaped in the form of a unilaterally fixed spring which is released periodically by an eccentric.

In Fig. 2 a spring 16 is fixed at one end at 17, a free end 18 being adjacent the point at which a film tape 19 is required to be struck off a transporting tooth 20. For this purpose the spring 16 is provided with an aperture 21 (see Fig. 4). Below this aperture an eccentric 22 is provided which periodically releases the loaded spring in that an eccentric part 23 is enabled to move through the aperture 21. Immediately thereupon the free end 18 of the spring strikes the film tape 19 at high speed.

Figure 3:
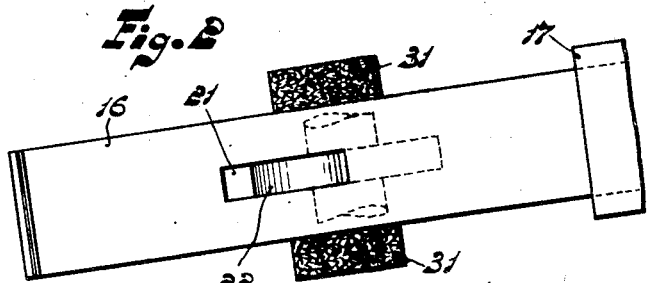
Fig. 3 is an elevation of a striking-off mechanism in which the spring is periodically released by a roller arranged so as to be co-axial with the drive roller and directly coupled thereto.
Figure 3:
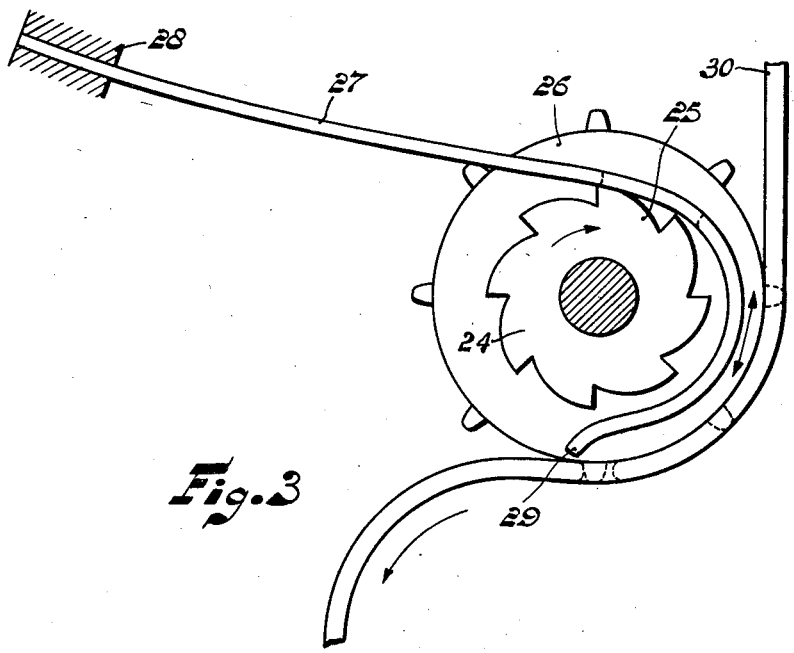

In Fig. 3 a roller 24 comprising cams 25 is arranged so as to be co-axial with a drive roller 26 and directly coupled thereto. A spring 27 is fixed at 28, a free end 29 periodically striking a film tape 30 in a manner similar to that in the device shown in Fig. 2. On both sides of the spring damping means consisting of strips of felt 31 may be secured rigidly to the device, as shown in Fig. 4. In this case the spring 16 is required to reciprocate vertically between the strips 31 which are urged against the spring.

What is claimed is:

1. A device for driving an unshrunk, perforated picture film tape which is scanned by a light ray comprising a toothed, constant speed, drive roller, the circular pitch of which is arranged so as to slightly exceed the length of a picture frame on said film tape, means for disengaging each of said teeth of the drive roller in a predetermined position thereof from said film tape at a place between picture frames, said means including a spring fixed at one end thereof, an eccentric, means mounting said eccentric for intermittent engagement with said spring whereby the free end of said spring at precise time intervals strikes a portion of said film tape to thereby remove said portion from the teeth of said drive roller.

2. A device as set forth in claim 1 further comprising a second roller mounted co-axially and directly coupled to said drive roller, said second roller having a number of cams on the periphery thereof corresponding to the number of teeth on said drive roller.

3. A device as set forth in claim 2 wherein said spring is bent and is thereby substantially U-shaped at the free end thereof, and the extreme free end of said spring intermittently strikes the film tape off the drive roller.

4. A device as set forth in claim 1 wherein said spring is provided with a damping means.

5. A device as set forth in claim 1 wherein said spring is provided with a damping means constituted of strips of damping material arranged securely on both sides of said spring.

References Cited in the file of this patent

UNITED STATES PATENTS 2,569,280    Bedford _____ Sept. 25, 1951